United States Patent
Håkansson

(10) Patent No.: US 6,213,106 B1
(45) Date of Patent: Apr. 10, 2001

(54) FLUID-OPERATED VALVE ASSEMBLY

(75) Inventor: Nils Olof Håkansson, Stenkullen (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/355,549

(22) PCT Filed: Jan. 27, 1998

(86) PCT No.: PCT/SE98/00110
§ 371 Date: Oct. 18, 1999
§ 102(e) Date: Oct. 18, 1999

(87) PCT Pub. No.: WO98/34019
PCT Pub. Date: Aug. 6, 1998

(30) Foreign Application Priority Data

Jan. 30, 1997 (SE) .................................... 9700269

(51) Int. Cl.⁷ .............................. F02M 25/07; F02D 9/04
(52) U.S. Cl. ....................................... 123/568.2; 251/63.4
(58) Field of Search ........................... 123/568.11, 568.2, 123/568.21, 568.25, 568.26, 568.27; 60/605.2; 251/63.4

(56) References Cited

U.S. PATENT DOCUMENTS

| | | |
|---|---|---|
| 3,961,608 * | 6/1976 | Hertfelder . |
| 4,005,579 | 2/1977 | Lloyd . |
| 4,130,094 * | 12/1978 | Gropp . |
| 4,566,423 * | 1/1986 | Kenny et al. . |
| 5,163,295 | 11/1992 | Bradshaw . |
| 5,333,456 | 8/1994 | Bollinger . |
| 6,065,456 * | 5/2000 | Miyoshi et al. .................. 123/568.2 |

FOREIGN PATENT DOCUMENTS 9604287  3/1998  (SE) .

* cited by examiner

Primary Examiner—Andrew M. Dolinar
Assistant Examiner—Arnold Castro
(74) Attorney, Agent, or Firm—Lerner, David, Littenberg, Krumholz & Mentlik, LLP

(57) ABSTRACT

A fluid operated valve assembly is disclosed including a housing defining a cylinder, a piston arranged for reciprocal motion in the cylinder, a fluid inlet for admitting fluid into the working chamber of the cylinder to cause the piston to be displaced therein, a valve closure, a valve seat and a connector connecting the piston to the valve closure such that the closure is in an open position and the piston is in one end position and the valve closure sealingly engages the valve seat when the piston is in the other end position, the connector having a length which is variable dependent on the fluid pressure in the working chamber.

10 Claims, 3 Drawing Sheets

FLUID-OPERATED VALVE ASSEMBLY

TECHNICAL FIELD

The present invention relates to a fluid-operated valve assembly according to the preamble of claim 1.

The invention further relates to the use of a fluid-operated valve assembly for operating EGR valves in a diesel-engined vehicle.

BACKGROUND OF THE INVENTION

The need for hydraulic or compressed air-operated actuators, for example valve assemblies, exists in many technical areas. Traditional actuators have a piston arranged for reciprocal motion within a cylinder, with the piston cooperating with an actuator rod connected to a component, the relative position of which is to be changed. In valve assemblies, such a component is a valve closure member. Typically, the piston is provided with at least one piston ring to ensure no leakage of the operating fluid past the piston. In many applications, the piston rings are made of a soft, elastic material such as rubber or a plastics material. In working environments in which an actuator may be subjected to high temperatures, however, it is not possible to use materials having a low melting point. In such cases it has hitherto been necessary to employ piston rings made of, for example, spring steel.

Nevertheless, even spring steel has limitations as regards temperatures to which it may be subjected. For example, unless special precautions are taken, it is not possible to use such an actuator in the vicinity of the exhaust manifold of an internal combustion engine.

A fluid-operated actuator which employs a piston which needs no piston rings is described in SE 9604287-4 in the name of the present applicant. In said document, spring means maintains the piston in a first end position in which a first region of the piston is in sealing engagement with a first valve seat in the piston housing. The actuator is operated by admitting air to the cylinder such that the air acts on the piston and overcomes the spring force of the spring means to thereby displace the piston to a second end position whereat a second region of the piston is in sealing engagement with a second valve seat in the housing. In order to cause the piston to readopt its first end position, air is evacuated from the cylinder and the spring means forces the piston into sealing engagement with the first valve seat.

When the actuator of SE 9604287-4 is used to operate a valve closure member, the valve closure member is connected to the piston via an actuator rod. To ensure that the valve closure member will sealingly engage its valve seat when the piston is in its second end position, even though the stroke of the piston may not exactly correspond to the stroke of the valve closure member, the actuator rod cooperates with the piston via a flexible coupling. The flexible coupling makes use of a helical spring to permit axial displacement of the actuator rod relative the piston.

Although the actuator disclosed in SE 9604287-4 offers considerable advantages over conventional actuators, its operation relies on the presence of spring means to ensure both the return action of the actuator as well as the sealing engagement of the valve closure member with its valve seat.

SUMMARY OF THE INVENTION

It is an object of the present invention to provide a fluid-operated valve assembly suitable for use in harsh environments, the operation of which is not dependent on spring means acting on the piston.

This object is achieved by a valve assembly according to claim 1.

Preferred embodiments of the valve assembly according to the present invention are detailed in the dependent claims.

The invention further relates to the use of the claimed valve assembly in a diesel-engined vehicle, particularly as exhaust gas recirculation valves.

BRIEF DESCRIPTION OF THE DRAWINGS

The present invention will be described in the following in greater detail by way of example only and with reference to the attached drawings in which.

DETAILED DESCRIPTION OF PREFERRED EMBODIMENTS

Figure 1:
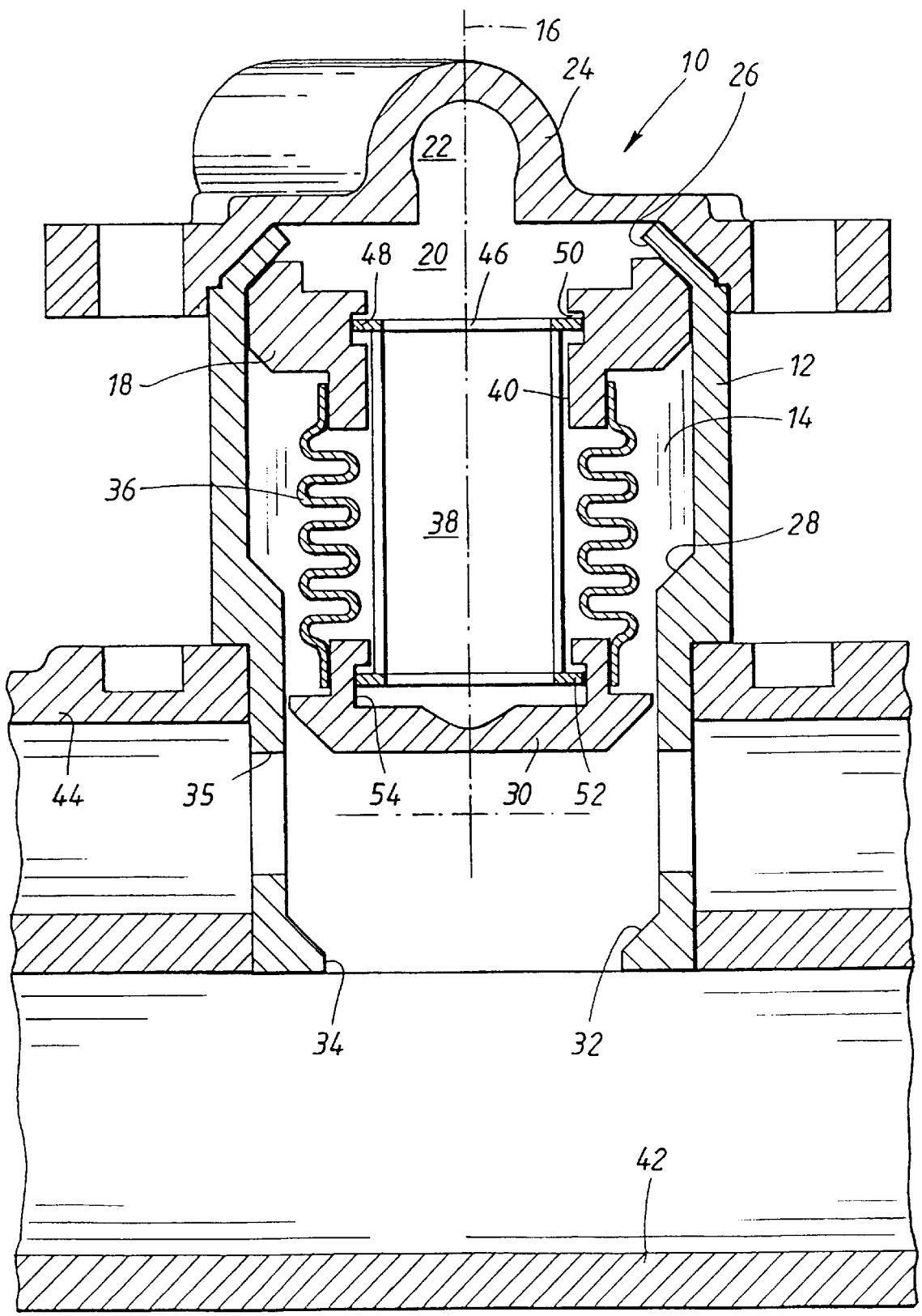
FIG. 1 is a schematic cross-sectional view through a fluid-operated valve assembly according to the present invention in a first end position.

In the drawings, reference numeral 10 generally denotes a fluid-operated valve assembly in accordance with the present invention. The valve assembly 10 comprises a housing 12 defining a cylinder 14 extending along a longitudinal axis 16. A piston 18 is arranged for reciprocal motion in the cylinder along the longitudinal axis 16. The piston 18 is arranged to be driven by an operating fluid, for example compressed air, which is introduced into a working chamber 20 in the cylinder 14 via a fluid inlet 22. In the embodiment shown in FIGS. 1 and 2, the fluid inlet 22 is provided in an end cap 24 which closes one axial end of the housing 12. Thus, the working chamber 20 is defined by the volume in the cylinder which is delimited by the end cap 24 and the piston 18.

Figure 2:
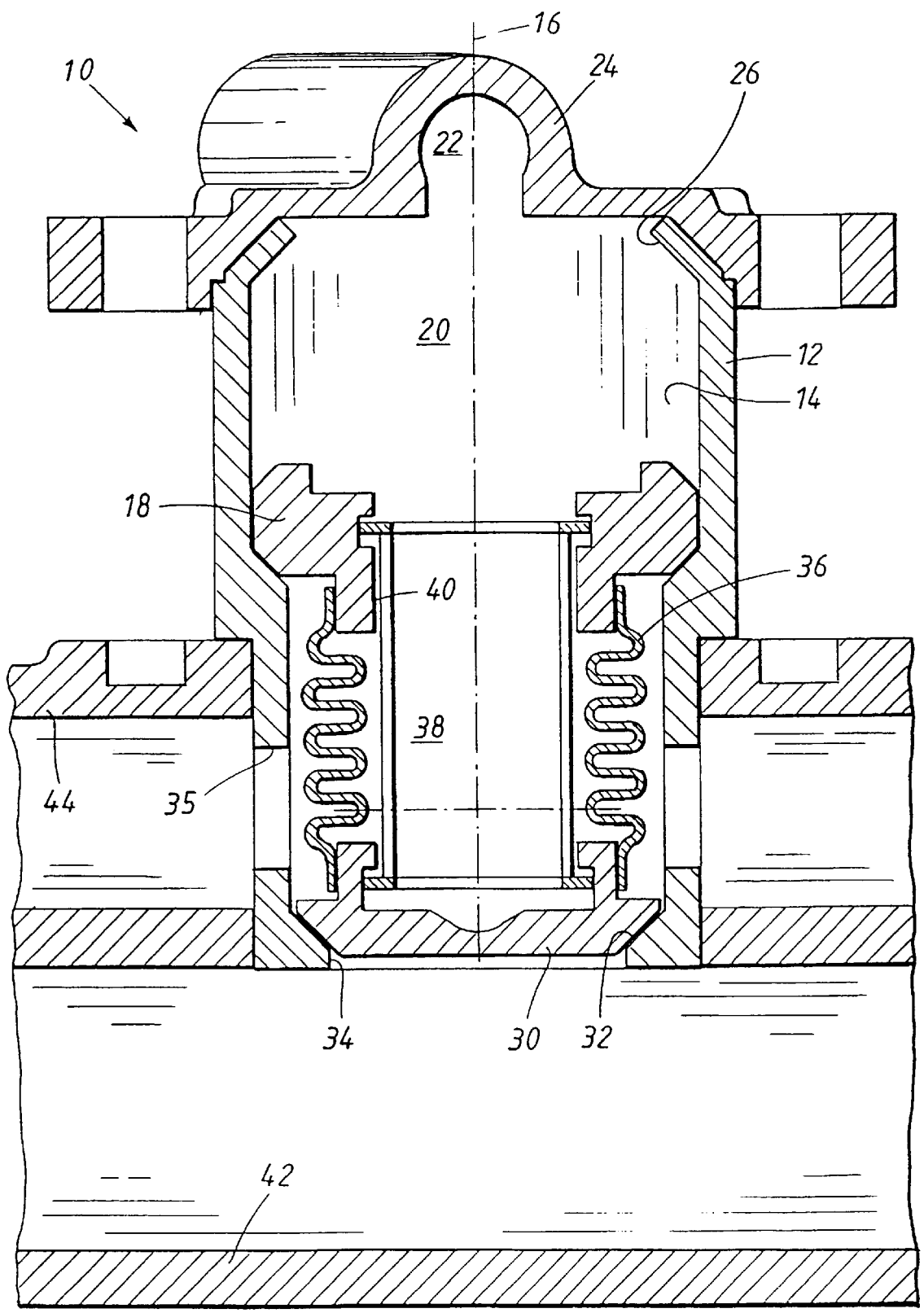
FIG. 2 is a schematic cross-sectional view corresponding to FIG. 1, though with the valve assembly in a second end position.

Introduction of the operating fluid causes the piston 18 to be displaced from a first end position at which the piston lies adjacent the inlet 22 to a second end position remote from the inlet. In the first end position, the piston 18 sealingly abuts a first sealing surface 26 of the cylinder 14. In the illustrated embodiment, the first sealing surface is advantageously formed by bending inwards a thinned wall region of the housing 12, though it is to be understood that the sealing surface may alternatively be provided on a separate insert within the housing. In the second end position, as shown in FIG. 2, the piston 18 sealingly abuts a second sealing surface 28. In the illustrated embodiment, the second sealing surface 28 is in the form of a shoulder created by a reduced diameter section of the cylinder 14. Alternatively, the cylinder 14 may have a substantially uniform diameter along its length, with the second sealing surface being provided on a separate insert within the housing.

The displacement of the piston 18 from its first end position to its second end position is used to effect displacement of a valve closure member 30 from an open position shown in FIG. 1 in which the valve closure member 30 is accommodated an axial distance within the housing 12, to a closed position shown in FIG. 2 in which the valve closure member sealingly engages a valve seat 32 in the vicinity of the axial end of the housing opposite the inlet 22. Thus, in the second end position of the piston 18, the valve closure member 30 seals an end opening 34 in the end of the housing, whilst in its open position, the valve closure member places the end opening 34 in communication with one or more circumferential openings 35 in the housing 12.

To ensure that the valve closure member 30 will sealingly engage the valve seat 32 when the piston reaches its second end position without requiring the stroke of the piston to be exactly the same as the stroke of the closure member, the piston is connected to the valve closure member via connection means 36 of variable length. In a preferred embodiment, and as illustrated in FIGS. 1 and 2, the connection means is a flexible bellows made from, for example, steel. Alternatively, the connection means may be a telescopic arrangement comprising two or more relatively displaceable concentric tubes.

The connection means 36 may have an annular cross section and is advantageously laser-welded at its respective ends to the piston and valve closure member. Thus, in the axial direction, the connection means 36 defines an interior chamber 38 which is closed at one end by the valve closure member 30. Due to the flexible nature of the connection means, an increase in pressure in the interior chamber 38 will tend to cause the connection means to increase in length. In other words, the distance of the valve closure member 30 from the piston 18 will increase.

The pressure in the interior chamber 38 is advantageously determined by the inlet pressure, i.e. the pressure in the working chamber 20. In such a case, and as illustrated in FIGS. 1 and 2, the piston 18 is provided with one or more through holes 40 to thereby allow the interior chamber 38 to communicate with the working chamber 20.

The operation of the fluid-operated valve assembly 10 described above will now be explained with reference to FIGS. 1 and 2 in which the end opening 34 of the assembly communicates with an exhaust manifold 42 of an internal combustion engine, and the circumferential openings 35 communicate with an exhaust gas recirculation pipe 44.

When no pressurized fluid is supplied to the working chamber 20 of the cylinder 14, back pressure in the exhaust manifold 42 acts on the valve closure member 30 and the underside of the piston 18 to displace the piston towards its first end position and to maintain it there. Thus, the valve closure member 30 adopts its open position to thereby connect the exhaust manifold 42 to the recirculation pipe 44.

When it is desired to close the end opening 34 to thereby prevent recirculation of exhaust gases, compressed air is introduced into the working chamber 20 via the fluid inlet 22. The compressed air acts i.a. on the piston 18 to cause the piston to move rapidly from its first end position to its second end position. Since the interior chamber 38 communicates with the working chamber 20, the compressed air will also act on the valve closure member 30 which, as well as the fact that the piston and the valve closure member are connected by the bellows 36, ensures that the valve closure member 30 will be displaced towards the end opening 34.

Due to the flexible nature of the bellows 36, once the piston 18 reaches its second end position at which it abuts the second sealing surface 28, the air pressure in the interior chamber 38 will cause the bellows 36 to expand until the valve closure member 30 sealingly engages the valve seat 32. This is of course the case should the stroke of the piston be less than the stroke of the valve closure member. If the converse be true, the air pressure acting on the piston 18 will cause the bellows to compress once the valve closure member has engaged the valve seat 32 so that the piston may reach its second end position.

In a typical application of the fluid-operated valve assembly according to the present invention, the piston 18 may have a diameter of about 50 mm and a stroke of about 20 mm. The bellows 36 may have an unpressurized length of about 30 mm. To accommodate any differences in stroke length between the piston 18 and the valve closure member 30, it is normally sufficient for the bellows to be able to alter its length by about 0.3 mm. This relatively small change in length of the bellows ensures that the strain on the bellows is correspondingly small and, as such, a usefully long working life of the bellows can be ensured.

In the unlikely event of the piston 18 or the valve closure member 30 seizing in the cylinder, it would be advantageous to be able to ensure that no unnecessary strain be placed on the bellows 36. In other words, if the piston were to seize half way between its first end position and its second end position, the air pressure acting in the interior chamber 38 would strive to expand the bellows to cause the valve closure member to approach the end opening 34. Such an expansion of the bellows could seriously weaken the bellows.

Accordingly, in a preferred embodiment of the invention, and as illustrated in FIG. 1, the valve assembly is provided with an expansion limiting means 46 connecting the piston 18 to the valve closure member 30. Advantageously, the expansion limiting means 46 passes through the interior chamber 38. The expansion limiting means may be a substantially cylindrical framework of steel rods. A first end of the expansion limiting means has a plurality of radially extending projections 48 which are located in a circumferentially extending cutaway 50 in the through hole 40 of the piston. In a corresponding manner, a second end of the expansion limiting means 46 has a plurality of radially extending projections 52 which are located in a cutaway 54 in an internal bore of the valve closure member 30. At least one of the cutaways 50, 54 has an axial extension which is greater than the axial extension of the projections to thereby limit the amount by which the bellows can expand.

From the above, it will be apparent that the valve assembly according to the present invention can consist of very few components. Since the piston only ever occupies either of its end positions, there is no need to provide sealing between the piston and the cylinder wall during displacement of the piston between its end positions. As such, no piston rings are required and the valve assembly is capable of tolerating high temperatures. As such, the valve assembly according to the present invention is eminently suitable for use as an EGR valve for an internal combustion engine.

Figure 3:
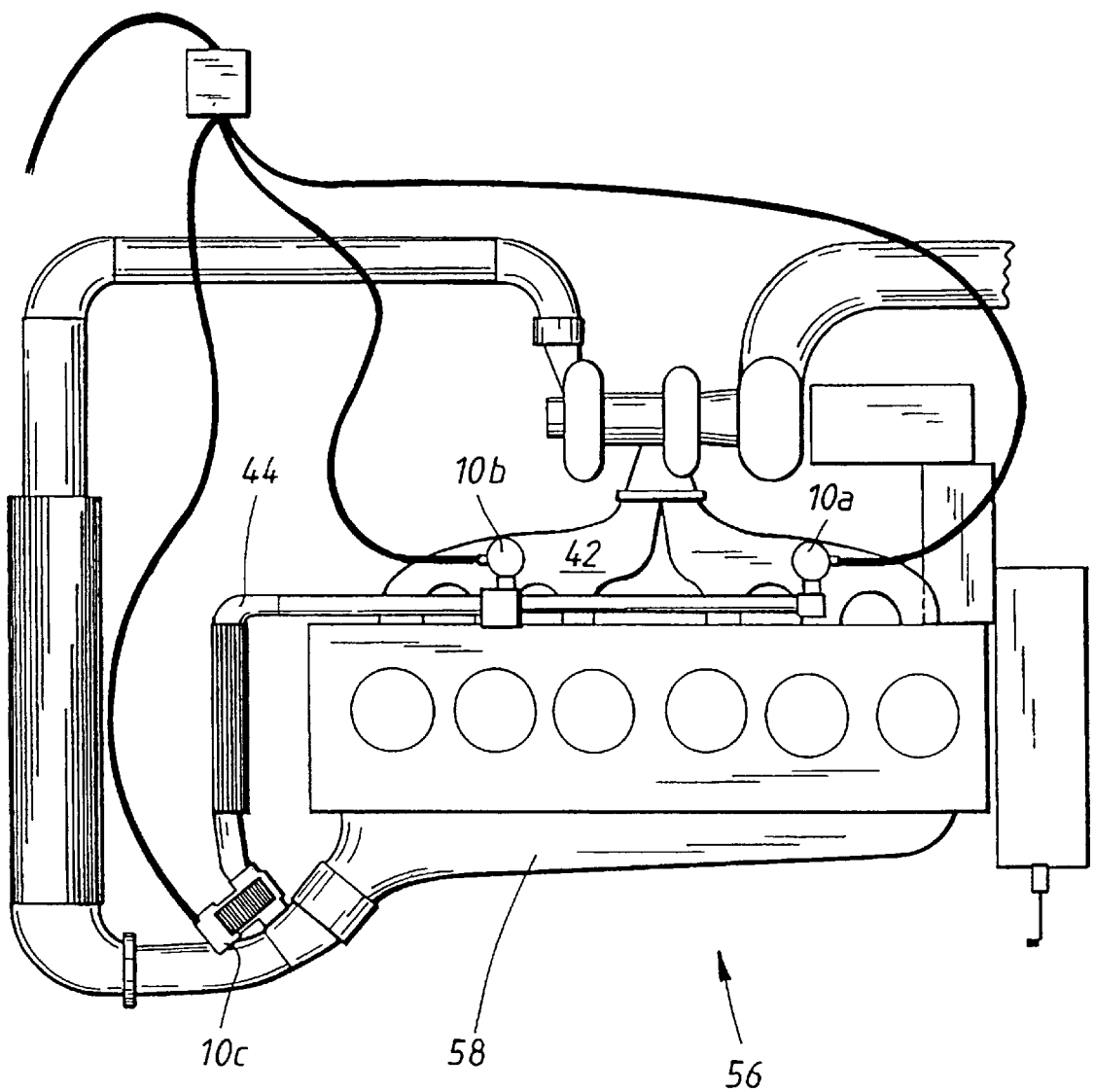
FIG. 3 is a schematic plan view of a diesel engine equipped with a plurality of valve assemblies according to the present invention.

A diesel engine 56 is schematically illustrated in FIG. 3, which engine is provided with a plurality of valve assemblies 10a, 10b, 10c of the present invention connected in series. The engine has an inlet manifold 58, an exhaust manifold 42 and an exhaust gas recirculation (EGR) pipe 44. The area of the EGR pipe 44 which is open for gas flow is controlled by the valve assemblies 10a, 10b, 10c. Advantageously, the first valve assembly 10a provides either 0% or 33% open area, whilst the second valve assembly 10b provides either 0% or 67% open area. The third valve assembly 10c in its closed position provides 10% open area and 100% in its open position.

Thus, when all valves are closed, there is no gas flow along the EGR pipe. When only the first valve assembly 10a is open, 10% open area is exposed. When both the first and the third valve assemblies are open, 33% open area is exposed. When only the second and third valve assemblies are open, 67% open area is exposed. Finally, when all valve assemblies are open, 100% open area is exposed. In this manner, various degrees of opening of the EGR pipe can be achieved without having to resort to the use of a variable displacement valve. Naturally, since the third valve assembly 10c is only used to control the flow along a single passage, it may be of the type disclosed in SE 9604287-4.

The invention is not restricted to the embodiments described above and shown in the drawings, but may be varied within the scope of the appended claims. For example, in certain embodiments the piston may be provided with guiding rings which nevertheless allow operating fluid to leak between the piston and the cylinder wall.

What is claimed is:

1. A fluid-operated valve assembly comprising:

a housing defining a cylinder extending along a longitudinal axis and including a working chamber;

a piston arranged for reciprocal motion in said cylinder along said longitudinal axis between a first end position and a second end position;

a fluid inlet for admitting fluid into said working chamber in said cylinder to cause said piston to be displaced from said first end position to said second end position;

a valve closure member;

a valve seat; and connection means connecting said piston to said valve closure member such that said valve closure member is in an open position when said piston is in said first end position and said valve closure member sealingly engages said valve seat when said piston is in said second end position, said connection means having a length which is variable dependent on the fluid pressure in said working chamber.

2. The valve assembly as claimed in claim 1, wherein said connection means has an annular cross section such that said connection means axially defines an interior chamber.

3. The valve assembly as claimed in claim 2, wherein said piston has at least one through hole cooperating with said interior chamber.

4. The valve assembly as claimed in any one of claims 1 to 3, wherein said connection means comprises a flexible bellows.

5. The valve assembly as claimed in claim 4, wherein said flexible bellows is made from steel.

6. The valve assembly as claimed in claim 1, including an expansion limiting means connecting said piston to said valve closure member.

7. The valve assembly as claimed in claim 6, wherein said expansion limiting means passes through said interior chamber.

8. The valve assembly as claimed in claim 1, wherein said valve closure member is adapted to selectively connect an exhaust manifold to an exhaust gas recirculation pipe of an internal combustion engine.

9. Use of a valve assembly as claimed in claim 1 for operating EGR valves in a diesel-engined vehicle.

10. The use of a plurality of valve assemblies as claimed in claim 1 connected in series for controlling the amount of exhaust gas recirculation in a diesel-engined vehicle.

* * * * *

UNITED STATES PATENT AND TRADEMARK OFFICE
CERTIFICATE OF CORRECTION

PATENT NO.    : 6,213,106 B1
DATED         : April 10, 2001
INVENTOR(S)   : Nils Olof Hakansson It is certified that error appears in the above-identified patent and that said Letters Patent is hereby corrected as shown below:

Delete columns 1-6 and substitute therefore columns 1-6 as shown on the attached pages.

Signed and Sealed this

Sixth Day of May, 2003

JAMES E. ROGAN
*Director of the United States Patent and Trademark Office*

FLUID-OPERATED VALVE ASSEMBLY

FIELD OF THE INVENTION

The present invention relates to a fluid-operated valve assembly suitable for use in harsh environments, such as the high, temperatures associated with typical combustion engines.

The present invention further relates to the use of a fluidoperated valve assembly for operating EGR valves in a diesel-engined vehicle.

BACKGROUND OF THE INVENTION

The need for hydraulic or compressed air-operated actuators, for example valve assemblies, exists in many technical areas. Traditional actuators have a piston arranged for reciprocal motion within a cylinder, with the piston cooperating with an actuator rod connected to a component, the relative position of which is to be changed. In valve assemblies, such a component is a valve closure member. Typically, the piston is provided with at least one piston ring to ensure no leakage of the operating fluid past the piston. In many applications, the piston rings are made of a soft, elastic material such as rubber, or a plastic material. In working environments in which an actuator may be subjected to high temperatures, however, it is not possible to use materials having a low melting point. In such cases it has been necessary to employ piston rings made of, for example, spring steel.

Nevertheless, even spring steel has limitations as regards the temperatures to which it may be subjected. For example, unless special precautions are taken, it is not possible to use such an actuator in the vicinity of the exhaust manifold of an internal combustion engine.

A fluid-operated actuator which employs a piston which needs no piston rings is described in Swedish Patent No. 9604287-4 in the name of the present applicant. In this document, spring means maintains the piston in a first end position in which a first region of the piston is in sealing engagement with a first valve seat in the piston housing. The actuator is operated by admitting air to the cylinder such that the air acts on the piston and overcomes the spring force of the spring means to thereby displace the piston to a second end position in which a second region of the piston is in sealing engagement with a second valve seat in the housing. In order to cause the piston to re-adopt its first end position, air is evacuated from the cylinder and the spring means forces the piston into sealing engagement with the first valve seat.

When the actuator of Swedish Patent No. 9604287-4 is used to operate a valve closure member, the valve closure member is connected to the piston by means of an actuator rod. To ensure that the valve closure member will sealingly engage its valve seat when the piston is in its second end position, even though the stroke of the piston may not exactly correspond to the stroke of the valve closure member, the actuator rod cooperates with the piston by means of a flexible coupling. The flexible coupling makes use of a helical spring to permit axial displacement of the actuator rod relative the piston.

Although the actuator disclosed in Swedish Patent No. 9604287-4 offers considerable advantages over conventional actuators, its operation relies on the presence of spring means to ensure both the return action of the actuator as well as the sealing engagement of the valve closure member with its valve seat.

It is an object of the present invention to provide a fluid-operated valve assembly suitable for use in harsh environments, the operation of which is not dependent on spring means acting on the piston.

SUMMARY OF THE INVENTION

In accordance with the present invention, this and other objects have now been realized by the discovery of a fluid operated valve assembly comprising a housing defining a cylinder extending along a longitudinal axis and including a working chamber, a piston arranged for reciprocal motion in the cylinder along the longitudinal axis between a first end position and a second end position, a fluid inlet for admitting fluid into the working chamber in the cylinder to cause the piston to be displaced from the first end position to the second end position, a valve closure member, a valve seat, and connection means connecting the piston to the valve closure member such that the valve closure member is in an open position when the piston is in the first end position and the valve closure member sealingly engages the valve seat when the piston is in the second end position, the connection means having a length which is variable dependent upon the fluid pressure in the working chamber. In accordance with a preferred embodiment of the valve assembly of the present invention, the connection means has an annular cross section such that the connection means axially defines an interior chamber. Preferably the piston has at least one through hole cooperating with the interior chamber.

In accordance with one embodiment of the valve assembly of the present invention, the connection means comprises a flexible bellows. Preferably, the flexible bellows is made from steel.

In accordance with another embodiment of the valve assembly of the present invention, an expansion limiting means is included connecting the piston to the valve closure member. Preferably, the expansion limiting means passes through the interior chamber.

In accordance with another embodiment of the valve assembly of the present invention, the valve closure member is adapted to selectively connect an exhaust manifold to an exhaust gas recirculation pipe of an internal combustion engine.

In accordance with another aspect of the present invention, the use of a valve assembly as set forth above is disclosed for updating EGI valves in a diesel engine vehicle.

In accordance with another aspect of the present invention, the use of a plurality of valve assemblies as set forth above connected in a series is disclosed for controlling the amount of exhaust gas recirculation in a diesel engined vehicle.

BRIEF DESCRIPTION OF THE DRAWINGS

The present invention will be described in the following detailed description in greater detail by way of example only and with reference to the attached drawings in which:

FIG. 1 is a side, elevational, schematic cross-sectional view through a fluid-operated valve assembly according to the present invention in a first end position;

FIG. 2 is a side, elevational, schematic cross-sectional view corresponding to FIG. 1, though with the valve assembly in a second end position; and FIG. 3 is a top, elevational, schematic plan view of a diesel engine equipped with a plurality of valve assemblies according to the present invention.

DETAILED DESCRIPTION

In the drawings, reference numeral 10 generally denotes a fluid-operated valve assembly in accordance with the present invention. The valve assembly 10 comprises a housing 12 defining a cylinder 14 extending along a longitudinal axis 16. A piston 18 is arranged for reciprocal motion in the cylinder along the longitudinal axis 16. The piston 18 is arranged to be driven by an operating fluid, for example compressed air, which is introduced into a working chamber 20 in the cylinder 14 through a fluid inlet 22. In the embodiment shown in FIGS. 1 and 2, the fluid inlet 22 is provided in an end cap 24 which closes one axial end of the housing 12. Thus, the working chamber 20 is defined by the volume in the cylinder which is delimited by the end cap 24 and the piston 18.

Introduction of the operating fluid causes the piston 18 to be displaced from a first end position at which the piston lies adjacent the inlet 22 to a second end position remote from the inlet. In the first end position, the piston 18 sealingly abuts a first sealing surface 26 of the cylinder 14. In the illustrated embodiment, the first sealing surface is advantageously formed by bending inwards a thinned wall region of the housing 12, though it is to be understood that the sealing surface may alternatively be provided on a separate insert within the housing. In the second end position, as shown in FIG. 2, the piston 18 sealingly abuts a second sealing surface 28. In the illustrated embodiment, the second sealing surface 28 is in the form of a shoulder created by a reduced diameter section of the cylinder 14. Alternatively, the cylinder 14 may have a substantially uniform diameter along its length, with the second sealing surface being provided on a separate insert within the housing.

The displacement of the piston 18 from its first end position to its second end position is used to effect displacement of a valve closure member 30 from an open position shown in FIG. 1 in which the valve closure member 30 is accommodated an axial distance within the housing 12, to a closed position shown in FIG. 2 in which the valve closure member sealingly engages a valve seat 32 in the vicinity of the axial end of the housing opposite the inlet 22. Thus, in the second end position of the piston 18, the valve closure member 30 seals an end opening 34 in the end of the housing, while in its open position, the valve closure member places the end opening 34 in communication with one or more circumferential openings 35 in the housing 12.

To ensure that the valve closure member 30 will sealingly engage the valve seat 32 when the piston reaches its second end position without requiring the stroke of the piston to be exactly the same as the stroke of the closure member, the piston is connected to the valve closure member by means of connection means 36 of variable length. In a preferred embodiment, and as illustrated in FIGS. 1 and 2, the connection means is a flexible bellows made from, for example, steel. Alternatively, the connection means may be a telescopic arrangement comprising two or more relatively displaceable concentric tubes.

The connection means 36 may have an annular cross section and is advantageously laser-welded at its respective ends to the piston and valve closure member. Thus, in the axial direction, the connection means 36 defines an interior chamber 38 which is closed at one end by the valve closure member 30. Due to the flexible nature of the connection means, an increase in pressure in the interior chamber 38 will tend to cause the connection means to increase in length. In other words, the distance of the valve closure member 30 from the piston 18 will increase.

The pressure in the interior chamber 38 is advantageously determined by the inlet pressure, i.e. the pressure in the working chamber 20. In such a case, and as illustrated in FIGS. 1 and 2, the piston 18 is provided with one or more through holes 40 to thereby allow the interior chamber 38 to communicate with the working chamber 20.

The operation of the fluid-operated valve assembly 10 described above will now be explained with reference to FIGS. 1 and 2 in which the end opening 34 of the assembly communicates with an exhaust manifold 42 of an internal combustion engine, and the circumferential openings 35 communicate with an exhaust gas recirculation pipe 44.

When no pressurized fluid is supplied to the working chamber 20 of the cylinder 14, back pressure in the exhaust manifold 42 acts on the valve closure member 30 and the underside of the piston 18 to displace the piston towards its first end position and to maintain it there. Thus, the valve closure member 30 adopts its open position to thereby connect the exhaust manifold 42 to the recirculation pipe 44.

When it is desired to close the end opening 34 to thereby prevent recirculation of exhaust gases, compressed air is introduced into the working chamber 20 through the fluid inlet 22. The compressed air acts i.a. on the piston 18 to cause the piston to move rapidly from its first end position to its second end position. Since the interior chamber 38 communicates with the working chamber 20, the compressed air will also act on the valve closure member 30 which, as well as the fact that the piston and the valve closure member are connected by the bellows 36, ensures that the valve closure member 30 will be displaced towards the end opening 34.

Due to the flexible nature of the bellows 36, once the piston 18 reaches its second end position at which it abuts the second sealing surface 28, the air pressure in the interior chamber 38 will cause the bellows 36 to expand until the valve closure member 30 sealingly engages the valve seat 32. This is of course the case should the stroke of the piston be less than the stroke of the valve closure member. If the converse is true, the air pressure acting on the piston 18 will cause the bellows to compress once the valve closure member has engaged the valve seat 32 so that the piston may reach its second end position.

In a typical application of the fluid-operated valve assembly according to the present invention, the piston 18 may have a diameter of about 50 mm and a stroke of about 20 mm. The bellows 36 may have an unpressurized length of about 30 mm. To accommodate any differences in stroke length between the piston 18 and the valve closure member 30, it is normally sufficient for the bellows to be able to alter its length by about 0.3 mm. This relatively small change in length of the bellows ensures that the strain on the bellows is correspondingly small and, as such, a usefully long working life of the bellows can be ensured.

In the unlikely event of the piston 18 or the valve closure member 30 seizing in the cylinder, it would be advantageous to be able to ensure that no unnecessary strain be placed on the bellows 36. In other words, if the piston were to seize half way between its first end position and its second end position, the air pressure acting in the interior chamber 38 would strive to expand the bellows to cause the valve closure member to approach the end opening 34. Such an expansion of the bellows could seriously weaken the bellows.

Accordingly, in a preferred embodiment of the present invention, and as illustrated in FIG. 1, the valve assembly is provided with an expansion limiting means 46 connecting the piston 18 to the valve closure member 30. Advantageously, the expansion limiting means 46 passes through the interior chamber 38. The expansion limiting means may be a substantially cylindrical framework of steel rods. A first end of the expansion limiting means has a plurality of radially extending projections 48 which are located in a circumferentially extending cutaway 50 in the through hole 40 of the piston. In a corresponding manner, a second end of the expansion limiting means 46 has a plurality of radially extending projections 52 which are located in a cutaway 54 in an internal bore of the valve closure member 30. At least one of the cutaways, 50 and 54, has an axial extension which is greater than the axial extension of the projections to thereby limit the amount by which the bellows can expand.

From the above, it will be apparent that the valve assembly according to the present invention can consist of very few components. Since the piston only ever occupies either of its end positions, there is, no need to provide sealing between the piston and the cylinder wall during displacement of the piston between its end positions. As such, no piston rings are required and the valve assembly is capable of tolerating high temperatures. As such, the valve assembly according to the present invention is eminently suitable for use as an EGR valve for an internal combustion engine.

A diesel engine 56 is schematically illustrated in FIG. 3, which engine is provided with a plurality of valve assemblies, 10a, 10b and 10c, of the present invention connected in series. The engine has an inlet manifold 58, an exhaust manifold 42 and an exhaust gas recirculation (EGR) pipe 44. The area of the EGR pipe 44 which is open for gas flow is controlled by the valve assemblies 10a, 10b, 10c. Advantageously, the first valve assembly 10a provides either 0% or 33% open area, while the second valve assembly 10b provides either 0% or 67% open area. The third valve assembly 10c in its closed position provides 10% open area and 100% in its open position.

Thus, when all valves are closed, there is no gas flow along the EGR pipe. When only the first valve assembly 10a is open, 10% open area is exposed. When both the first and the third valve assemblies are open, 33% open area is exposed. When only the second and third valve assemblies are open, 67% open area is exposed. Finally, when all valve assemblies are open, 100% open area is exposed. In this manner, various degrees of opening of the EGR pipe can be achieved without having to resort to the use of a variable displacement valve. Naturally, since the third valve assembly 10c is only used to control the flow along a single passage, it may be of the type disclosed in Swedish Patent No. 9604287-4.

The invention is not restricted to the embodiments described above and shown in the drawings, but may be varied within the scope of the appended claims. For example, in certain embodiments the piston may be provided with guiding rings which nevertheless allow operating fluid to leak between the piston and the cylinder wall.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A fluid-operated valve assembly comprising:

a housing defining a cylinder extending along a longitudinal axis and including a working chamber;

a piston arranged for reciprocal motion in said cylinder along said longitudinal axis between a first end position and a second end position;

a fluid inlet for admitting fluid into said working chamber in said cylinder to cause said piston to be displaced from said first end position to said second end position;

a valve closure member;

a valve seat; and connection means connecting said piston to said valve closure member such that said valve closure member is in an open position when said piston is in said first end position and said valve closure member sealingly engages said valve seat when said piston is in said second end position, said connection means having a length which is variable dependent on the fluid pressure in said working chamber.

2. The valve assembly as claimed in claim 1, wherein said connection means has an annular cross section such that said connection means axially defines an interior chamber.

3. The valve assembly as claimed in claim 2, wherein said piston has at least one through hole cooperating with said interior chamber.

4. The valve assembly as claimed in any one of claims 1 to 3, wherein said connection means comprises a flexible bellows.

5. The valve assembly as claimed in claim 4, wherein said flexible bellows is made from steel.

6. The valve assembly as claimed in claim 1, including an expansion limiting means connecting said piston to said valve closure member.

7. The valve assembly as claimed in claim 6, wherein said expansion limiting means passes through said interior chamber.

8. The valve assembly as claimed in claim 1, wherein said valve closure member is adapted to selectively connect an exhaust manifold to an exhaust gas recirculation pipe of an internal combustion engine.

9. Use of a valve assembly as claimed in claim 1 for operating EGR valves in a diesel-engined vehicle.

10. The use of a plurality of valve assemblies as claimed in claim 1 connected in series for controlling the amount of exhaust gas recirculation in a diesel-engined vehicle.

* * * * *